(12) United States Patent
Sano et al.

(10) Patent No.: US 11,057,906 B2
(45) Date of Patent: Jul. 6, 2021

(54) RADIO COMMUNICATION APPARATUS AND RADIO COMMUNICATION METHOD

(71) Applicant: NTT DOCOMO, INC., Tokyo (JP)

(72) Inventors: Yousuke Sano, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,576

(22) PCT Filed: Apr. 28, 2017

(86) PCT No.: PCT/JP2017/016911
§ 371 (c)(1),
(2) Date: Nov. 7, 2018

(87) PCT Pub. No.: WO2017/195653
PCT Pub. Date: Nov. 16, 2017

(65) Prior Publication Data
US 2019/0191443 A1 Jun. 20, 2019

(30) Foreign Application Priority Data

May 10, 2016 (JP) .............................. JP2016-094941

(51) Int. Cl.
*H04W 72/10* (2009.01)
*H04W 72/12* (2009.01)
*H04L 29/06* (2006.01)

(52) U.S. Cl.
CPC ............. *H04W 72/10* (2013.01); *H04L 29/06* (2013.01); *H04W 72/12* (2013.01)

(58) Field of Classification Search
CPC ...... H04W 72/10; H04W 72/12; H04L 29/06; H04L 29/06353; H04L 29/06578
See application file for complete search history.

(56) References Cited

U.S. PATENT DOCUMENTS

2009/0041110 A1* 2/2009 Malladi ................. H04L 1/0067
   375/240
2009/0083606 A1* 3/2009 Choi ...................... H04H 20/57
   714/776

(Continued)

FOREIGN PATENT DOCUMENTS

EP    3443798 A1    2/2019
JP    2011229175 A   11/2011

(Continued)

OTHER PUBLICATIONS

Extended European Search Report issued in counterpart European Patent Application No. 17796014.3, dated Oct. 9, 2019 (8 pages).

(Continued)

*Primary Examiner* — Faruk Hamza
*Assistant Examiner* — Abusayeed M Haque
(74) *Attorney, Agent, or Firm* — Osha Bergman Watanabe & Burton LLP

(57) ABSTRACT

A radio communication apparatus functioning as a transmitter in a radio communication system including the transmitter and a receiver includes a first data generation unit that generates first data which are to be transmitted in accordance with a first transmission scheme, a second data generation unit that generates second data which are to be transmitted in accordance with a second transmission scheme, and a transmission unit that, when the second data are generated during transmission of the first data, punctures a portion in which a predetermined signal is transmitted in a resource allocated for the transmission of the first data, transmits the first data in an unpunctured portion, and transmits the second data in the punctured portion.

7 Claims, 5 Drawing Sheets

(56) References Cited

U.S. PATENT DOCUMENTS

| | | | |
|---|---|---|---|
| 2012/0147773 A1* | 6/2012 | Kim | H04L 1/0025 370/252 |
| 2012/0240185 A1* | 9/2012 | Kapoor | H04L 41/0866 726/1 |
| 2014/0029508 A1* | 1/2014 | Kim | H04B 7/15507 370/315 |
| 2014/0254509 A1 | 9/2014 | Chen et al. | |
| 2015/0208290 A1* | 7/2015 | Seo | H04W 36/0055 370/331 |
| 2015/0341942 A1* | 11/2015 | Lee | H04B 7/0623 370/252 |
| 2016/0056935 A1* | 2/2016 | Damnjanovic | H04W 76/27 370/252 |
| 2016/0128056 A1* | 5/2016 | Jiang | H04L 5/0007 370/329 |
| 2016/0157196 A1* | 6/2016 | Xia | H04W 56/001 370/336 |
| 2016/0170929 A1* | 6/2016 | Pethe | G06F 13/4022 710/313 |
| 2016/0270055 A1 | 9/2016 | Larsson et al. | |
| 2016/0278003 A1* | 9/2016 | Kim | H04L 5/00 |
| 2016/0381690 A1* | 12/2016 | Kim | H04W 72/08 370/329 |
| 2017/0238260 A1* | 8/2017 | Kim | H04W 72/042 455/522 |
| 2017/0295592 A1* | 10/2017 | Yang | H04W 72/1215 |
| 2018/0239047 A1* | 8/2018 | Hou | E21B 49/003 |
| 2019/0223175 A1* | 7/2019 | Hakola | H04W 72/14 |

FOREIGN PATENT DOCUMENTS

| | | | |
|---|---|---|---|
| WO | 2015/114525 A1 | 8/2015 | |
| WO | 2017180371 A1 | 10/2017 | |

OTHER PUBLICATIONS

NTT DOCOMO; "New SID Proposal: Study on New Radio Access Technology"; 3GPP TSG RAN Meeting #71 RP-160671; Göteborg, Sweden, Mar. 7-10, 2016 (8 pages).
3GPP TS 36.211 V14.0.0; "3rd Generation Partnership Project; Technical Specification Group Radio Access Network; Evolved Universal Terrestrial Radio Access (E-UTRA); Physical channels and modulation (Release 14)"; Sep. 2016 (170 pages).
3GPP TS 36.212 V14.0.0; "3rd Generation Partnership Project; Technical Specification Group Radio Access Network; Evolved Universal Terrestrial Radio Access (E-UTRA); Multiplexing and channel coding (Release 14)"; Sep. 2016 (148 pages).
3GPP TS 36.213 V14.0.0; "3rd Generation Partnership Project; Technical Specification Group Radio Access Network; Evolved Universal Terrestrial Radio Access (E-UTRA); Physical layer procedures (Release 14)"; Sep. 2016 (406 pages).
3GPP TS 36.331 V14.0.0; "3rd Generation Partnership Project; Technical Specification Group Radio Access Network; Evolved Universal Terrestrial Radio Access (E-UTRA); Radio Resource Control (RRC); Protocol specification (Release 14)"; Sep. 2016 (643 pages).
International Search Report issued for PCT/JP2017/016911, dated May 30, 2017 (4 pages).
Written Opinion for PCT/JP2017/016911, dated May 30, 2017 (7 pages).
Office Action issued in the counterpart European Patent Application No. 17796014.3, dated Nov. 16, 2020 (4 pages).

* cited by examiner

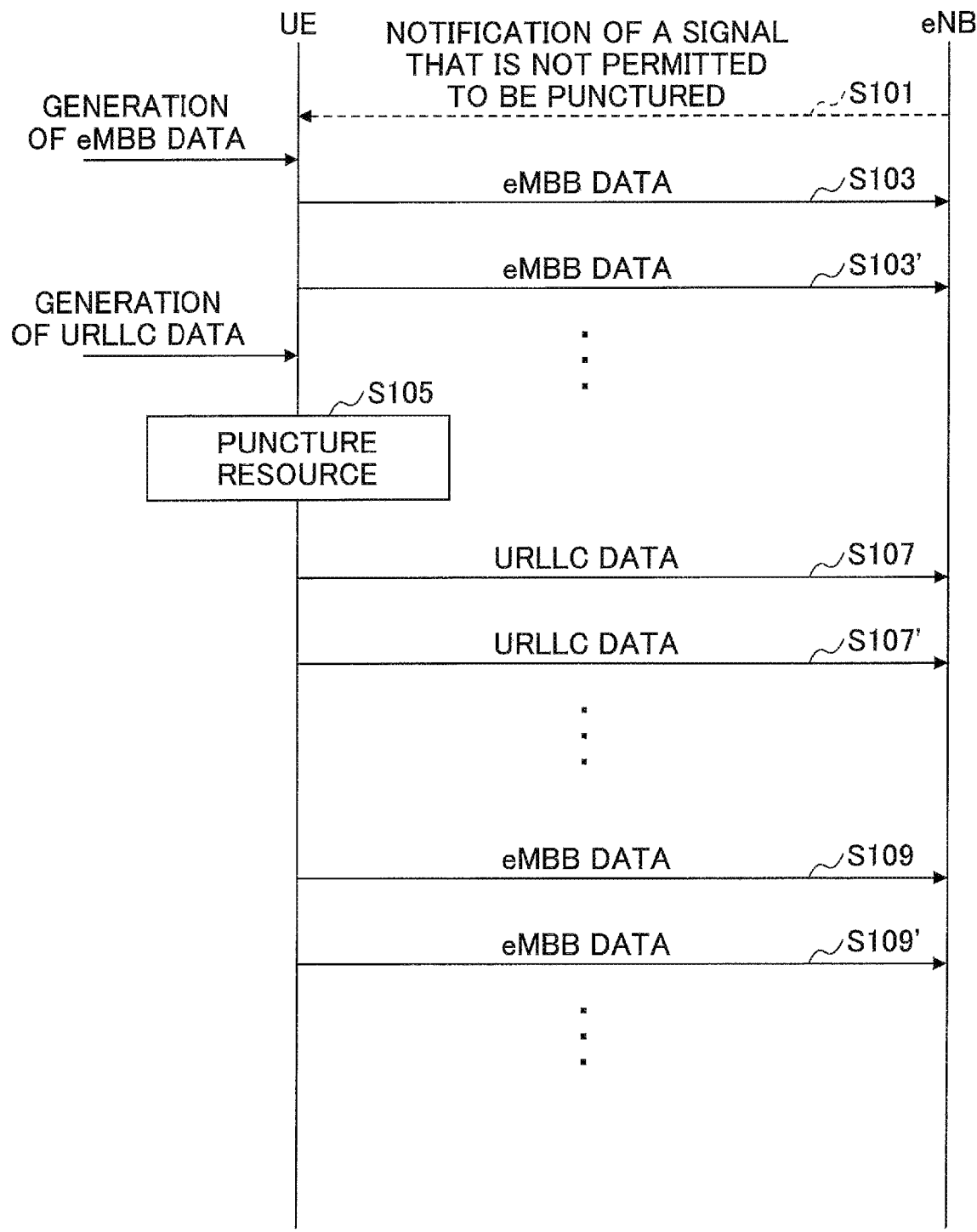

PUNCTURING EXAMPLE 1

PUNCTURING EXAMPLE 2

PUNCTURING EXAMPLE 3

RADIO COMMUNICATION APPARATUS AND RADIO COMMUNICATION METHOD

TECHNICAL FIELD

The present invention relates to a radio communication apparatus and a radio communication method in a radio communication system.

BACKGROUND ART

Currently, in the 3rd generation partnership project (3GPP), a next-generation system, called 5G is under discussion as a successor of long term evolution-advanced (LTE-A) which is one of the fourth generation radio communication systems. In 5G, three use cases, that is, extended mobile broadband (eMBB), massive machine type communication (mMTC), and ultra reliability and low latency communication (URLLC) are mainly considered (see Non-Patent Document 1).

URLLC aims to implement radio communication with low delay and high reliability. As measures to implement low delay in URLLC, introduction of a short TTI length (also referred to as a "subframe length" or a "subframe interval"), shorter control delay from packet generation to data transmission, and so on are under discussion. Furthermore, as measures to implement high reliability in URLLC, introduction of an encoding scheme and a modulation scheme with a low coding rate for implementing a lower bit error rate, utilization of diversity, and so on are under discussion.

As a use case of URLLC, mission-critical machine type communication (MTC) such as remote medical care or vehicle behavior control for accident prevention is mainly considered.

PRIOR ART DOCUMENTS

Non-Patent Documents

Non-Patent Document 1: NTT DOCOMO, "3GPP™ Work Item Description", 3GPP TSG RAN Meeting #71, RP-160671, 7-10 Mar. 2016

SUMMARY OF THE INVENTION

Problem to be Solved by the Invention

In URLLC, there is a possibility that data with high urgency are unexpectedly generated, and thus it is necessary to transmit unexpectedly-generated data with low delay and high reliability. In addition to URLLC, even in transmission schemes of other communication services such as mMTC, LTE, license-assisted access (LAA), and/or eMBB, there is a possibility that data with high urgency are unexpectedly generated.

Such data with high urgency may be generated during transmission of other data. For example, a packet of URLLC data may be generated during transmission of eMBB data. In this case, if transmission of data with high urgency (for examples URLLC) starts after transmission of other data (for example, eMBB) is completed, delay occurs and it may be unable to satisfy the requirement of the low delay.

However, if data with high urgency are transmitted during transmission of other data, signals of these data may interfere with each other and there is a possibility that a receiver is unable to properly detect the data. In order to reduce interference between the signals of these data, a technique of puncturing resources of other data to transmit data with high urgency can be considered, but signal detection accuracy of other data or frequency usage efficiency may be reduced.

It is an object of the present invention to transmit, with low delay, data with high urgency, while reducing interference between the data with high urgency and other data.

Means for Solving Problem

A radio communication apparatus according to an embodiment of the present invention is a radio communication apparatus functioning as a transmitter in a radio communication system including the transmitter and a receiver, and includes a first data generation unit that generates first data which are to be transmitted in accordance with a first transmission scheme, a second data generation unit that generates second data which are to be transmitted in accordance with a second transmission scheme, and a transmission unit that, when the second data are generated during transmission of the first data, punctures a portion in which a predetermined signal is transmitted in a resource allocated for the transmission of the first data, transmits the first data in an unpunctured portion, and transmits the second data in the punctured portion.

Effect of the Invention

According to the present invention, it is possible to transmit, with low delay, data with high urgency, while reducing interference between the data with high urgency and other data.

BRIEF DESCRIPTION OF DRAWINGS

FIG. 3 is a sequence diagram of a radio communication method in a radio communication system according to an embodiment of the present invention;

DETAILED DESCRIPTION OF THE PREFERRED EMBODIMENTS

Hereinafter, an embodiment of the present invention will be described with reference to the accompanying drawings. In the following embodiment, a radio communication apparatus functioning as a transmitter or a receiver in a radio communication system including the transmitter and the receiver will be described. When second data to be transmitted in accordance with a second transmission scheme (for example, URLLC) are generated during transmission of first data to be transmitted in accordance with a first transmission scheme (for example, eMBB), the radio communication apparatus functioning as the transmitter punctures a portion in which a predetermined signal is transmitted in a resource allocated for transmission of the first data, transmits the first data in an unpunctured portion, and transmits the second data in the punctured portion. As will be described below, the predetermined signal to be punctured may be a signal with low importance for the first transmission scheme, and a signal not to be punctured may be a signal with high importance for the first transmission scheme. The radio communication apparatus functioning as the receiver detects that the second data are transmitted in accordance with the second transmission scheme in the punctured portion, receives the first data in the unpunctured portion and receives the second data in the punctured portion. Accordingly, the radio communication apparatus can transmit the second data with low delay. In the following embodiment, eMBB and URLLC will be described as examples of the first transmission scheme and the second transmission scheme, respectively, but any combination of eMBB, URLLC, mMTC, LTE, LAA, eMBB, and/or a transmission scheme of another communication service may be used as the first transmission scheme and the second transmission scheme. Further, LTE is used in a broad meaning including not only a communication system, corresponding to Release 8 or 9 of 3GPP, but also a communication system corresponding to Release 10, 11, 12, or 13 of 3GPP and a fifth generation communication system corresponding to Release 14 or later of 3GPP. In the following embodiment, data transmitted in accordance with eMBB are referred to as "eMBB data", and data transmitted in accordance with URLLC are referred, to as "URLLC data".

System Configuration

Figure 1:
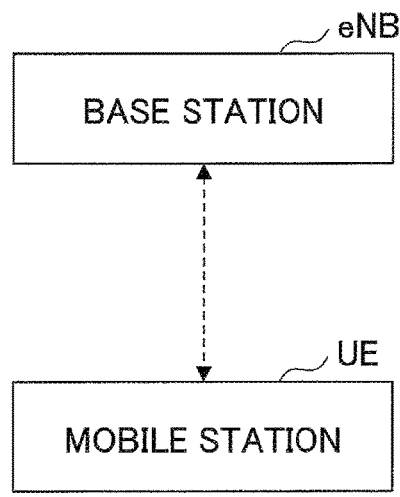
FIG. 1 is a schematic diagram illustrating a radio communication system according to an embodiment of the present invention.

FIG. 1 is a schematic diagram illustrating an exemplary configuration of a radio communication system, according to an embodiment of the present invention. As illustrated in FIG. 1, the radio communication system according to the embodiment of the present invention includes a base station eNB and a mobile station UE. In the example of FIG. 1, one base station eNB and one mobile station UE are illustrated, but a plurality of base stations eNBs may be included or a plurality of mobile stations UEs may be included.

The base station eNB can accommodate one or more (for example, three) cells (also referred to as "sectors"). When the base station eNB accommodates a plurality of cells, the entire coverage area of the base station eNB can be divided into a plurality of smaller areas, and a communication service can be provided in each smaller area through a base station subsystem (for example, a small indoor base station remote radio head (RRH)). The term "cell" or "sector" refers to part or whole of the coverage area in which the base station and/or the base station subsystem provides a communication service. Further, the terms "base station", "eNB", "cell", and "sector" can be used interchangeably in this specification. The base station eNB may be also referred to as a fixed station, a Node B, an eNode B (eNB), an access point, a femto cell, a small cell, or the like.

The mobile station UE may be also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The base station eNR and the mobile station UE perform downlink (DL) communication and uplink (UL) communication using a predetermined band. The predetermined band may be an LTE system band (for example, 20 MHz) or may be a band (for example, 1.4 MHz or 180 kHz) narrower than the LTE system band.

First, signals used in downlink communication will be described.

It is necessary for the mobile station UE to perform a cell search in order to communicate with the base station eNB. A signal used for the cell search is referred to as a "synchronization signal (SS)", and the synchronization signal includes a primary synchronization signal (PSS) that mainly aims for symbol timing synchronization and local ID detection and a secondary synchronization signal (SSS) that mainly aims for radio frame synchronization and cell group ID detection.

Basic information that the mobile station UE should read after the cell search is referred to as "broadcast information" and includes a master information block (MIB) including a system bandwidth, a system frame number, and so on, and a system information block (SIB) which is another kind of system information. The SIB may be transmitted through a downlink data channel which will be described later.

The mobile station UE receives downlink control information (DCI) using a downlink control channel arranged in a predetermined band, and the downlink control channel may be also referred to as a "physical downlink control channel (PDCCH)" or an "enhanced physical downlink control channel (ePDCCH)".

Further, a physical control format indicator channel (PCFICH) is used to indicate how many symbols are reserved for an area in which downlink control information can be transmitted at the head of each subframe.

The PCFICH, the PDCCH, and the ePDCCH may be referred to as an "L1/L2 control signal".

Further, the mobile station UE receives downlink data using a downlink shared channel (a downlink data channel) arranged in a predetermined band, and the downlink shared channel may be also referred to as a "physical downlink shared channel (PDSCH)".

Further, acknowledgment information (ACK/NACK) is transmitted in response to the uplink data channel, and the acknowledgment information may be also referred to as an "UL A/N" or a "physical HARQ indicator channel (PHICH)".

Further, a data demodulation reference signal is used for propagation path estimation, symbol timing synchronization, reception quality measurement, and so on for demodulating a data signal. The reference signal can be abbreviated as an RS and can be also referred to as a pilot depending on a standard to be applied. The data demodulation reference signal includes a demodulation reference signal (DMRS) and a cell-specific reference signal (CRS).

Further, a channel state information reference signal (CSI-RS) is used as a reference signal for quality measurement.

Next, signals used in uplink communication will be described.

The mobile station UE transmits uplink data using an uplink shared channel (an uplink data channel) arranged in a predetermined band, and the uplink shared channel may be also referred to as a "physical uplink shared channel (PUSCH)".

In uplink communication, the acknowledgment information (ACK/NACK) is also transmitted in response to the downlink data channel, and the acknowledgment information may be also referred to as a "DL A/N".

Further, the mobile station UE may transmit a scheduling request (SR) in order to request the base station eNB to allocate the uplink data channel.

Further, the mobile station UE that receives the CSI-RS may transmit channel state information (CSI) in order to transmit quality measurement information to the base station.

Further, a data demodulation reference signal is used for propagation path estimation, symbol timing synchronization, reception quality measurement, and so on for demodulating a data signal. The data demodulation reference signal may be also referred to as a "demodulation reference signal (DMRS)".

A sounding reference signal (SRS) is used as a reference signal for quality measurement.

An L1/L2 control signal may be used in uplink communication.

The channels and the signals mentioned above are examples in LTE, and names different from the names mentioned above may be used.

The channels and the signals are transmitted, for example, in predetermined portions in resources arranged in a time domain and a frequency domain. A radio frame may be formed by one or more frames in the time domain. Each of one or more frames in the time domain may be also referred to as a subframe. Further, the subframe may be formed by one or more slots in the time domain. Further, the slot may be formed by one or more symbols (OFDM symbols, SC-FDMA symbols, or the like) in the time domain. Each of the radio frame, the subframe, the slot, and the symbol represents a time unit in which a signal is transmitted. The radio frame, the subframe, the slot, and the symbol may have different corresponding names. For example, in an LTE system, the base station performs scheduling to allocate a radio resource (a frequency bandwidth, transmission power, or the like which can be used by each mobile station) to each mobile station. A minimum time unit of scheduling may be referred to as a transmission time interval (TTI). For example, one subframe may be referred to as a TTI, a plurality of consecutive subframes may be referred to as a TTI, or one slot may be referred to as a TTI.

A resource block (RB) is a resource allocation unit in the time domain and the frequency domain and may include one or more consecutive subcarriers in the frequency domain. In the time domain of the resource block, one or more symbols may be included, and a length of one slot, one subframe, or one TTI may be used. Each of one TTI and one subframe may be formed by one or more resource blocks. The structure of the radio frame described above is merely an example, and the number of subframes included in the radio frame, the number of slots included in the subframe, the number of symbols and resource blocks included in the slot, and the number of subcarriers included in the resource block can be modified in various ways.

In the embodiment of the present invention, it is assumed that URLLC data with high urgency are generated during transmission of eMBB data from the mobile station UE or the base station eNB. In this case, a portion of the resource allocated for transmission of the eMBB data is punctured, and the URLLC data are transmitted in the punctured portion.

Figure 2:
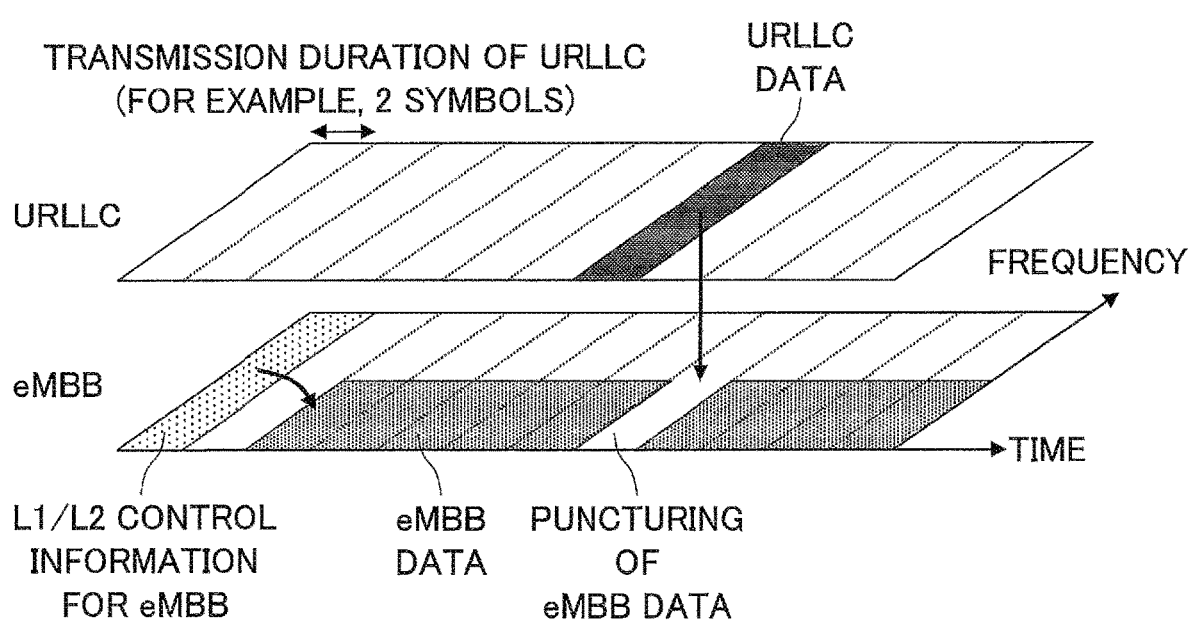
FIG. 2 is a schematic diagram illustrating an example of transmitting URLLC data during transmission of eMBB data.

FIG. 2 is a schematic diagram illustrating an example of transmitting URLLC data during transmission of eMBB data. FIG. 2 illustrates an example in which URLLC data corresponding to a transmission duration of two symbols are generated during transmission of eMBB data corresponding to a transmission duration of twenty symbols. Then, resources corresponding to the transmission duration of two symbols allocated for transmission of the eMBB data are punctured, and the URLLC data are transmitted in the punctured resources.

"Puncturing" represents that no signal is transmitted in a portion of a resource allocated for transmission of a signal. For example, as illustrated in FIG. 2, puncturing may be no transmission of all or some of the symbols for eMBB. In this case, the symbols for URLLC are transmitted instead of all or some of the symbols for eMBB which are not transmitted. The following description will proceed with an example in which all or some of the symbols are not transmitted, but it is also possible to implement puncturing through other techniques. For example, puncturing may be implemented by overriding information bits for eMBB with information bits for URLLC. In this case, some of segments before the eMBB data are encoded are used for URLLC. As another example, puncturing may be implemented by changing a modulation order for the eMBB data. For example, the modulation scheme for the eMBB data may be changed from QPSK (two bits) to 16 QAM (four bits), and an URLLC signal may be embedded in the remaining two bits. As another example, the modulation order for the eMBB data may not be changed, and some bits may be shared by the eMBB data and the URLLC data. For example, when the modulation scheme is QPSK, one bit in the first half of two transmittable bits may be used for eMBB, and one bit in the second half may be used for URLLC. In this case, the bits for eMBB interrupted by URLLC are punctured.

However, in the case in which the eMBB data are punctured, and the URLLC data are interrupted, if a signal with high importance for eMBB is punctured, signal detection accuracy of the eMBB data or frequency usage efficiency may be reduced. For this reason, in the embodiment of the present invention, a signal with high importance for eMBB is not punctured.

As described above with reference to FIG. 1, various signals are used in uplink communication and downlink communication. For example, in downlink communication, L1/L2 control signals (PCFICH, PDCCH, and ePDCCH), broadcast information (MIB and SIB), synchronization signals (PSS and SSS), data demodulation reference signals (DMRS and CRS), and an UL A/N (PHICH) may be classified as signals that are not permitted to be punctured, and a data signal (PDSCH) and a reference signal for quality measurement (CSI-RS) may be classified as signals which may be punctured. For example, when a portion of a data signal (PDSCH) is punctured, it is possible to transmit the data signal in the unpunctured resource by increasing a coding rate. For example, when a portion of a reference signal for quality measurement (CSI-RS) is punctured, a reference signal for quality measurement transmitted in another subframe can be used instead. Thus these signals may be considered to have low importance for eMBB. Alternatively, when a reference signal for quality measurement (CSI-RS) is punctured, the mobile station UE may be prohibited from measuring channel quality using the punctured reference signal for quality measurement.

Further, in uplink communication, an L1/L2 control signal, a data demodulation reference signal (DMRS), a DL A/N, and an SR may be classified as signals that are not permitted to be punctured, and a data signal (PUSCH), CSI, and a reference signal for quality measurement (SRS) may be classified as signals which may be punctured. For example, when a portion of a data signal (PUSCH) is punctured, it is possible to transmit the data signal in the unpunctured resource by increasing a coding rate. For example, when a portion of CSI or a reference signal for quality measurement (SRS) is punctured, a signal transmitted in another subframe can be used instead. Thus these signals may be considered to have low importance for eMBB. Further, when a reference signal for quality measurement (SRS) is punctured, the base station eNB may be prohibited from measuring channel quality using the punctured reference signal for quality measurement.

The classification based on the importance in downlink communication and uplink communication is merely an example, and any other classification may be used.

Further, when a coding rate for the punctured eMBB data has such a high value that the eMBB data cannot be easily detected in a realistic environment (for example, 0.931 specified in LTE), the transmission of the URLLC data based on puncturing of the eMBB data may be prohibited, or the eMBB data may be punctured so that a coding rate does not exceed the high value, and a coding rate for the URLLC data may be adjusted before the transmission.

Processing Procedure

FIG. 3 is a sequence diagram of a radio communication method in the radio communication system according to the embodiment of the present invention.

First, the base station eNB may notify (for example, broadcast) the mobile station UE of a signal that is not permitted to be punctured and/or a signal that may be punctured (S101). The signal that is not permitted to be punctured and/or the signal that may be punctured may be classified based on whether importance of the signal is high or low for eMBB as described above.

When eMBB data to be transmitted are generated, the mobile station UE may transmit an SR to the base station eNB and request the base station eNB to allocate a resource. The base station eNB notifies the mobile station UE of the allocation of the resource, and the mobile station UE may transmit the eMBB data over a plurality of symbols (S103, S103', . . . ).

When URLLC data are generated during the transmission of the eMBB data, the mobile station UE punctures a portion allocated to the signal that may be punctured in the resource allocated for the transmission of the eMBB data (S105).

Figure 4A:
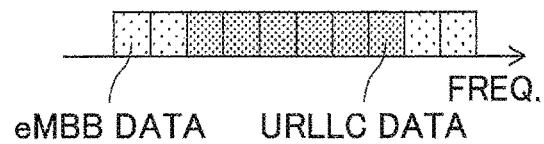
FIG. 4A is a first schematic diagram illustrating an example of puncturing eMBB data.
Figure 4B:
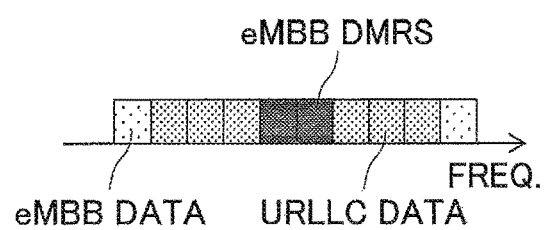
FIG. 4B is a second schematic diagram illustrating an example of puncturing eMBB data.
Figure 4C:
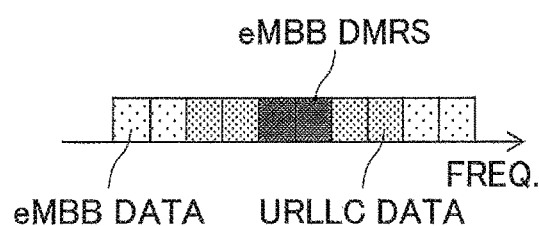
FIG. 4C is a third schematic diagram illustrating an example of puncturing eMBB data.

FIGS. 4A-4C illustrate examples of puncturing the eMBB data. For example, it is assumed that URLLC data of six symbols are generated during the transmission of the eMBB data. In this case, the mobile station UE punctures resources necessary for transmitting the URLLC data of six symbols among the resources allocated to the eMBB data. As illustrated in FIG. 4A, when a signal that is not permitted to be punctured is not placed in the resources in which the URLLC data are to be transmitted, the mobile station UE punctures resources of six symbols and transmits the URLLC data in the punctured resources.

On the other hand, as illustrated in FIG. 4B, when a signal (for example, a DMRS) that is not permitted to be punctured is placed in the resources in which the URLLC data are to be transmitted, the mobile station UE punctures resources of six symbols while avoiding resources of the signal that is not permitted to be punctured without changing a transmission resource amount of the URLLC data, and transmits the URLLC data in the punctured resources. In this case, the resources of the URLLC data can be secured, but the resources of the eMBB data are reduced.

Further, as illustrated in FIG. 4C, when a signal (for example, a DMRS) that is not permitted to be punctured is placed in the resources in which the URLLC data are to be transmitted, the mobile station UE punctures, for example, resources of four symbols while avoiding resources of the signal that is not permitted to be punctured. Then, rate matching of the URLLC data is performed to increase a coding rate for the URLLC data so that the URLLC data of six symbols can be transmitted with four symbols. As a result, it is possible to minimize the number of symbols of the eMBB data to be punctured. In this case, the resources of the eMBB data can be secured, but the coding rate for the URLLC data is increased.

In the examples illustrated in FIGS. 4A to 4C, when a coding rate for the punctured eMBB data is higher than a threshold value, the transmission of the URLLC data based on puncturing of the eMBB data may be prohibited, or the eMBB data may be punctured so that the threshold value is not exceeded, and a coding rate for the URLLC data may be adjusted before transmission, as described above.

The mobile station UE transmits the URLLC data in the punctured portion (S107). The mobile station UE may transmit the URLLC data over a plurality of symbols (S107, S107', . . . ). The mobile station UE may request the base station eNB to allocate a resource used for transmitting the URLLC data and then transmit the URLLC data in the resource allocated by the base station eNB or may transmit the URLLC data without requesting the base station eNB to allocate the resource used for transmitting the URLLC data.

When the base station eNB allocates the resource to the URLLC data, the base station eNB can receive the URLLC data in the allocated resource. On the other hand, when the base station eNB does not allocate the resource to the URLLC data, it is necessary for the base station eNB to detect that the URLLC data are embedded and transmitted during the transmission of the eMBB data. For example, candidates in which the URLLC data are embedded may be defined in advance, and the base station eMB may perform blind estimation within the candidates for detection. In this case, the detection may be performed using a cyclic redundancy check (CRC) of URLLC, or the detection may be performed by adding a preamble to the URLLC data for easier detection.

When the mobile station UE completes the transmission of the URLLC data, the mobile station UB may resume the transmission of the eMBB data (S109, S109', . . . ).

FIG. 3 illustrates uplink communication from the mobile station UE to the base station eNB, but the present invention is not limited to uplink communication but can be also applied to downlink communication from the base station eNB to the mobile station UE. In the case of downlink communication, instead of requesting the base station eNB to allocate a resource used for the mobile station UE to transmit the eMBB data and/or the URLLC data, the eMBB data and/or the URLLC data are transmitted in a resource allocated through scheduling performed by the base station eNB.

Functional Configuration

As described above, since the present invention is not limited to uplink communication but can be also applied to downlink communication, a transmitter that is an apparatus for transmitting the eMBB data and the URLLC data and a receiver that is an apparatus for receiving the eMBB data and the URLLC data will be described.

Figure 5:
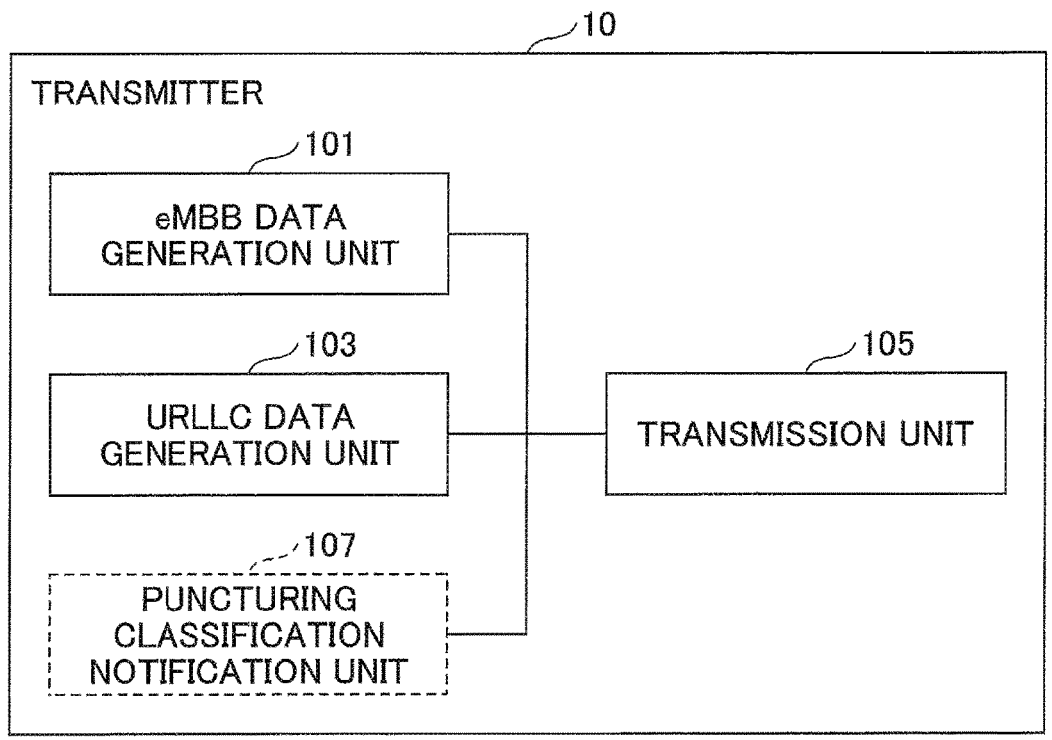
FIG. 5 is a block diagram illustrating a functional configuration of a transmitter according to an embodiment of the present invention.

FIG. 5 is a block diagram of a transmitter 10 according to an embodiment of the present invention.

The transmitter 10 includes an eMBB data generation unit 101, a URLLC data generation unit 103, and a transmission unit 105. In the case of downlink communication, the transmitter 10 corresponds to the base station eNB, and in this case, the transmitter 10 may further include a puncturing classification notification unit 107 that gives a notification indicating a signal which is not permitted to be punctured and/or a signal which may be punctured to the mobile station UE.

The eMBB data generation unit 101 generates data (eMBB data) to be transmitted in accordance with eMBB. In the case in which the transmitter 10 is included in the mobile station UE, the eMBB data may be transmitted using a resource allocated by the base station eNB in response to an SR transmitted from the mobile station UE. In the case in which the transmitter 10 is included in the base station eNB, the eMBB data may be transmitted using a resource allocated through scheduling in the base station eNB.

The URLLC data generation unit 103 generates data (URLLC data) to be transmitted in accordance with URLLC. In the case in which the transmitter 10 is included in the mobile station UE, the URLLC data may be transmitted using a resource allocated by the base station eNB in response to an SR transmitted from the mobile station UE or may be transmitted using candidates of resources defined in advance without using an SR transmitted from the mobile station UE. In the case in which the transmitter 10 is included in the base station eNB, the eMBB data may be transmitted using a resource allocated through scheduling in the base station eNB or may be transmitted using candidates of resources defined in advance without scheduling in the base station eNB.

When the URLLC data are generated during the transmission of the eMBB data, the transmission unit 105 punctures a portion in which a predetermined signal is transmitted in the resource allocated for transmission of the eMBB data, transmits the eMBB data in the unpunctured portion, and transmits the URLLC data in the punctured portion. As described above, the predetermined signal to be punctured may be determined based on whether the importance of the signal is high or low for eMBB.

Figure 6:
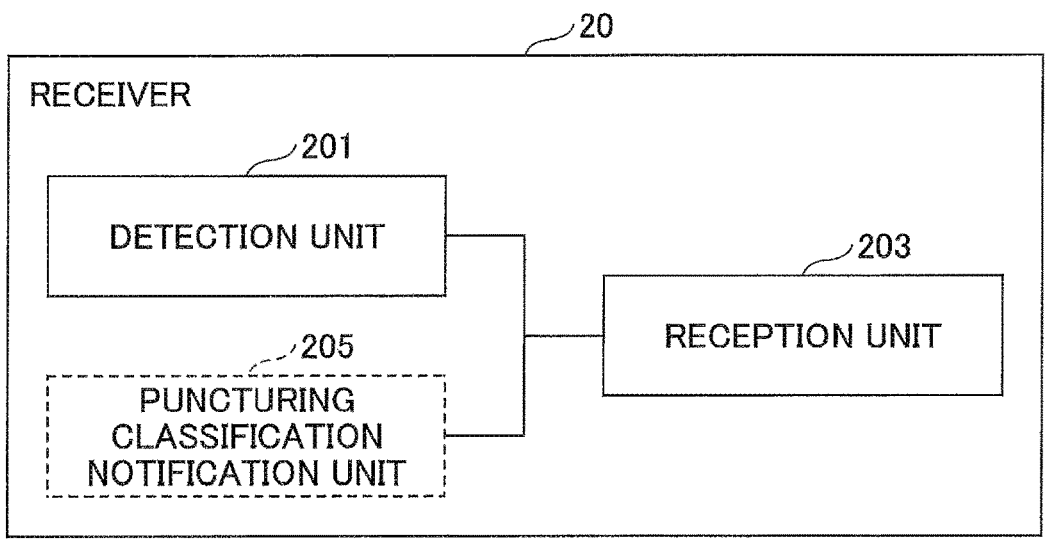
FIG. 6 is a block diagram illustrating a functional configuration of a receiver according to an embodiment of the present invention.

FIG. 6 is a block diagram of a receiver 20 according to an embodiment of the present invention.

The receiver 20 includes a detection unit 201 and a reception unit 203. In the case of uplink communication, the receiver 20 corresponds to the base station eNB, and in this case, the receiver 20 may further include a puncturing classification notification unit 205 that gives a notification indicating a signal which is not permitted to be punctured and/or a signal which may be punctured to the mobile station UE.

The detection unit 201 detects that a portion in which a predetermined signal is transmitted in the resource allocated for the transmission of the eMBB data is punctured, and the URLLC data are transmitted in the punctured portion. When the base station eNB allocates the resource, the detection unit 201 may detect the transmission of the URLLC data based on the allocation of the resource. Alternatively, the detection unit 201 may detect the transmission of the URLLC data by performing blind estimation within candidates in which the URLLC data are embedded. Further, when the detection unit 201 detects that a reference signal for quality measurement is punctured, the detection unit 201 may prohibit estimation of channel quality using the punctured reference signal for quality measurement.

The reception unit 203 receives the eMBB data in the unpunctured portion and receives the URLLC data in the punctured portion.

Hardware Configuration

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 7:
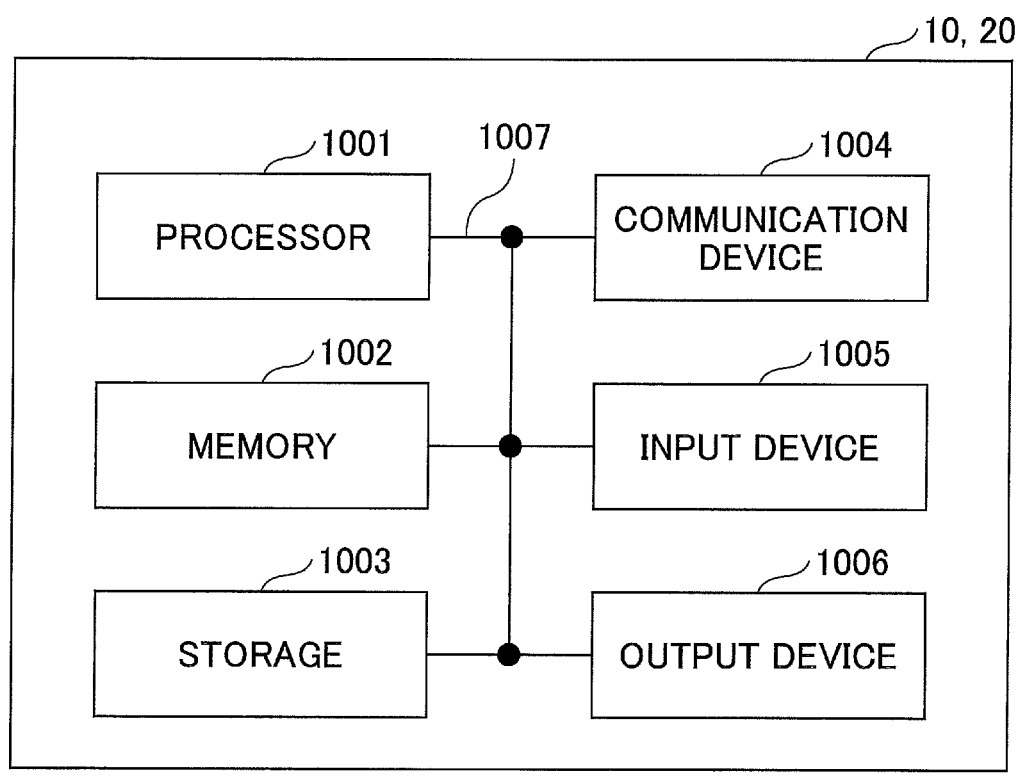
FIG. 7 is a diagram illustrating an example of a hardware configuration of a transmitter or a receiver according to an embodiment of the present invention.

For example, the transmitter 10, the receiver 20, or the like according to the embodiment of the invention may function as a computer that performs a radio communication method according to this embodiment. FIG. 7 is a diagram illustrating an example of a hardware configuration of the transmitter 10 or the receiver 20 according to this embodiment. Each of the transmitter 10 and the receiver 20 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the transmitter 10 or the receiver 20 may include one or a plurality of devices illustrated in FIG. 7 or may not include some of the devices.

Each function of the transmitter 10 and the receiver 20 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the eMBB data generation unit 101, the URLLC data generation unit 103, the puncturing classification notification unit 107, the detection unit 201, the puncturing classification notification unit 205, and so on may be implemented in the processor 1001.

The processor 1001 reads a program, (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the eMBB data generation unit 101 in the transmitter 10 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a radio communication method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 105, the reception unit 203, or the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

The devices such as the processor 1001 and/or the memory 1002 are connected to each other via the bus 1007 for information communication. The bus 1007 may be a single bus or the devices may be connected to each other by different buses.

Each of the transmitter 10 and the receiver 20 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Effects of Embodiment of Present Invention

According to an embodiment of the present invention, it is possible to transmit, with low delay, data with high urgency, while reducing interference between the data with high urgency and other data. For example, when a packet of URLLC data with high urgency is generated during transmission of eMBB data, it is possible to embed the URLLC data in the eMBB data and transmit the URLLC data, and thus it is possible to transmit the URLLC data with low delay.

Since signals are classified into a signal that is not permitted to be punctured and a signal that may be punctured in accordance with importance, it is possible to alleviate reduction in signal detection accuracy of the eMBB data or in frequency usage efficiency.

Furthermore, when there is a signal that is not permitted to be punctured in the resource in which the URLLC data are to be transmitted, it is possible to maintain reception quality of the URLLC data by transmitting the URLLC data without changing the transmission resource amount of URLLC. On the other hand, when there is a signal that is not permitted to be punctured in the resource in which the URLLC data are to be transmitted, it is possible to secure the resource of the eMBB data and alleviate the reduction in reception quality of the eMBB data through rate matching of URLLC.

Further, assuming that a preamble for detection or the like is defined, the receiver can blindly detect that the URLLC data are transmitted during the transmission of the eMBB data.

Puncturing may be implemented by overriding information bits for eMBB with information bits for URLLC. In this case, the receiver need not blindly detect that the URLLC data are transmitted during the transmission of the eMBB data. Further, puncturing may be implemented, by not transmitting some signals of the eMBB data, by changing a modulation order for the eMBB data. In this case, there is a possibility of becoming unable to receive the eMBB data, but it is possible to eliminate the loss of the eMBB caused by puncturing. Further, puncturing may be implemented by sharing some bits between the eMBB data and the URLLC data without changing a modulation order for the eMBB data. In this case, it is possible to improve detection accuracy of the eMBB data.

Supplementary Explanation

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment apparatus can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from, a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters axe used can be different from the numerical expression, disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims priority to Japanese Patent Application No. 2016-094941 filed on May 10, 2016, the entire contents of which are hereby incorporated by reference.

EXPLANATIONS OF REFERENCE NUMERALS eNB base station
UE mobile station 10 transmitter
101 eMBB data generation unit
103 URLLC data generation unit
105 transmission unit
107 puncturing classification notification unit
20 receiver
201 detection unit
203 reception unit
205 puncturing classification notification unit
1001 processor
1002 memory
1003 storage
1004 communication device
1005 input device
1006 output device
1007 bus

The invention claimed is:

1. A terminal comprising:
a receiver that receives downlink control information (DCI) about puncturing of a signal from a base station; and
a processor that assumes that a downlink signal other than a predetermined signal is not transmitted in one or more orthogonal frequency-division multiplex symbols determined based on the DCI,
wherein the predetermined signal comprises a synchronization signal that is transmitted in a punctured portion, the punctured portion includes the one or more orthogonal frequency-division multiplex symbols determined based on the DCI.

2. The terminal as claimed in claim 1, wherein the predetermined signal comprises broadcast information.

3. The terminal as claimed in claim 1, further comprising:
a transmitter that transmits an uplink signal in one or more orthogonal frequency-division multiplex symbols determined based on the DCI.

4. The terminal as claimed in claim 2, further comprising:
a transmitter that transmits an uplink signal in one or more orthogonal frequency-division multiplex symbols determined based on the DCI.

5. A communication method in a terminal, comprising:
receiving downlink control information (DCI) about puncturing of a signal from a base station; and
assuming that a downlink signal other than a predetermined signal is not transmitted in one or more orthogonal frequency-division multiplex symbols determined based on the DCI,
wherein the predetermined signal comprises a synchronization signal that is transmitted in a punctured portion, the punctured portion includes the one or more orthogonal frequency-division multiplex symbols determined based on the DCI.

6. A base station comprising:
a transmitter that transmits downlink control information (DCI) about puncturing of a signal to a terminal,
wherein the DCI is used by the terminal to determine that a downlink signal other than a predetermined signal is not transmitted in one or more orthogonal frequency-division multiplex symbols, and
wherein the predetermined signal comprises a synchronization signal that is transmitted in a punctured portion, the punctured portion includes the one or more orthogonal frequency-division multiplex symbols determined based on the DCI.

7. A system comprising a base station and a terminal,
the base station comprising:
a transmitter that transmits downlink control information (DCI) about puncturing of a signal, and
the terminal comprising:
a receiver that receives the DCI from the base station; and
a processor that assumes that a downlink signal other than a predetermined signal is not transmitted in one or more orthogonal frequency-division multiplex symbols determined based on the DCI,
wherein the predetermined signal comprises a synchronization signal that is transmitted in a punctured portion, the punctured portion includes the one or more orthogonal frequency-division multiplex symbols determined based on the DCI.

* * * * *